United States Patent
Höf et al.

(10) Patent No.: US 8,111,625 B2
(45) Date of Patent: Feb. 7, 2012

(54) METHOD FOR DETECTING A MESSAGE INTERFACE FAULT IN A COMMUNICATION DEVICE

(75) Inventors: Jonas Höf, München (DE); Norbert Löbig, Darmstadt (DE); Jürgen Tegeler, Penzberg (DE); Michael Tinnacher, Köflach (AT); Dieter Wallner, Graz (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1075 days.

(21) Appl. No.: 11/883,726

(22) PCT Filed: Sep. 9, 2005

(86) PCT No.: PCT/EP2005/054482
§ 371 (c)(1),
(2), (4) Date: Aug. 2, 2007

(87) PCT Pub. No.: WO2006/084510
PCT Pub. Date: Aug. 17, 2006

(65) Prior Publication Data
US 2008/0310314 A1 Dec. 18, 2008

(30) Foreign Application Priority Data
Feb. 8, 2005 (DE) .................. 10 2005 005 710

(51) Int. Cl.
*G01R 31/08* (2006.01)
(52) U.S. Cl. .................................. 370/242; 714/2
(58) Field of Classification Search .......... None
See application file for complete search history.

(56) References Cited

U.S. PATENT DOCUMENTS

| | | | |
|---|---|---|---|
| 5,668,800 A | 9/1997 | Stevenson | |
| 6,058,490 A * | 5/2000 | Allen et al. | 714/9 |
| 6,751,761 B1 * | 6/2004 | Tendo | 714/716 |
| 7,168,011 B2 * | 1/2007 | Spies et al. | 714/43 |
| 2004/0017780 A1 | 1/2004 | Tazebay et al. | |
| 2004/0042407 A1 * | 3/2004 | Karacelik et al. | 370/241 |

FOREIGN PATENT DOCUMENTS

| | | |
|---|---|---|
| EP | 0 788 267 A2 | 8/1997 |
| EP | 1 213 876 A1 | 6/2002 |
| WO | 0076134 A1 | 12/2000 |

OTHER PUBLICATIONS

R. Stewart, Q. Xie, K. Morneault, C. Sharp, H. Schwarzbauer, T. Taylor, I. Rytina, M. Kalla, L. Zhang, V. Paxson; "Stream Control Transmission Protocol"; Network Working Group—Request for Comments 2960; Oct. 1, 2000; pp. 1-126; IETF Standard, Internet Engineering Task Force, IETF, CH, XP015008743, ISSN: 0000-0003.

* cited by examiner

*Primary Examiner* — Kevin C Harper
(74) *Attorney, Agent, or Firm* — Laurence A. Greenberg; Werner H. Stemer; Ralph E. Locher

(57) ABSTRACT

In one aspect, a method for detecting the fault of a message interface in a communications device is provided, wherein the message interface comprises at least two layers which communicate with each other, a top layer accesses to the services of the lower layer and offers the services thereof to upper layers, for detecting a fault in the layers, at least one test application sends at least one test message for testing the information state of at least certain individual layers, thereby making it possible to control the information capabilities between the layers of the message interface.

15 Claims, 2 Drawing Sheets

FIG. 1
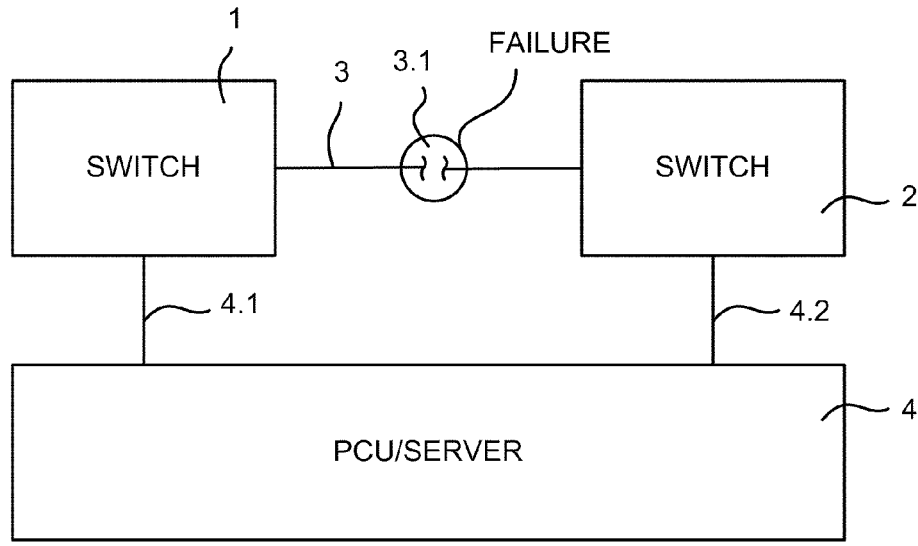
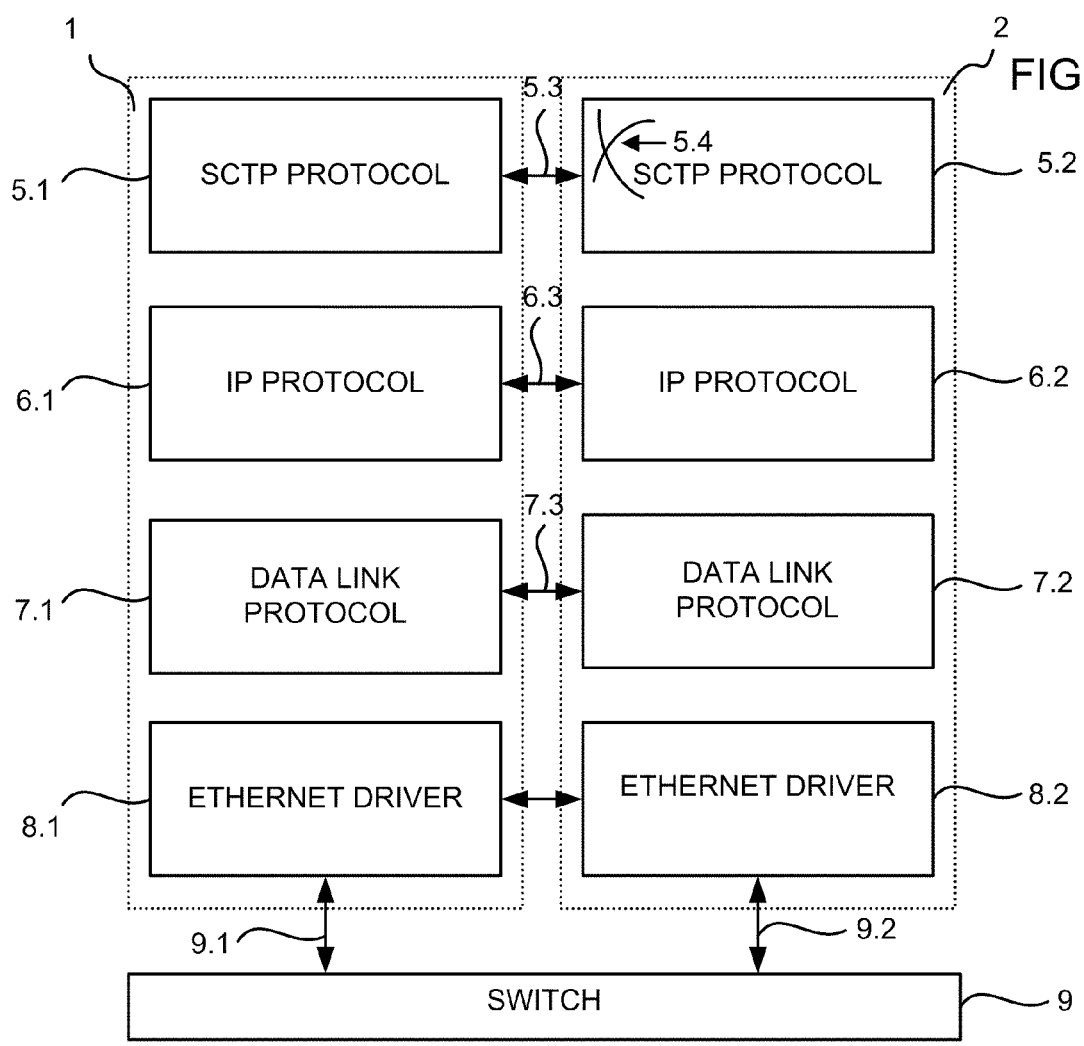
FIG. 2

METHOD FOR DETECTING A MESSAGE INTERFACE FAULT IN A COMMUNICATION DEVICE

CROSS REFERENCE TO RELATED APPLICATIONS

This application is the U.S. National Stage of International Application No. PCT/EP2005/054482, filed Sep. 9, 2005 and claims the benefit thereof. The International Application claims the benefits of German application No. 102005005710.1 DE filed Feb. 8, 2005, both of the applications are incorporated by reference herein in their entirety.

FIELD OF INVENTION

The invention relates to a method for detecting a message interface fault in a communications device, in which the message interface has at least two layers and the layers communicate with each other, and a higher layer accesses services on the layer below and offers its own services to higher layers.

SUMMARY OF INVENTION

Message interfaces of currently available communications units, for example of a Surpass server such as HIQ10, HIQ20, HIQ30 or PCU (Packet Control Unit) from Siemens, generally consist of several instances and layers, usually referred to as the communications stack. If one instance of the message interface fails, the message traffic can still be carried over the other instances. Before going beyond the interface, the messages usually pass through a hierarchy of layers. For the application using said communications stack, a fault in one of the layers is usually expressed only by a failure of the entire communications link. This uninformative picture of the fault does not generally allow targeted, quick and localized corrective measures. A higher outlay for repairs or higher recovery level and longer downtimes will usually result than would be the case if fault detection were targeted. Known operating systems generally provide the capability of detecting a failure or a fault in the first layer, the so-called physical layer. This offers the advantage of a relatively low implementation outlay for error handling. However, with the limited scope for testing this offers, it is not possible to check the ability of the other instances of the message interface to communicate with each other. Moreover, this implementation method does not allow targeted repair measures to be initiated below the level of rebooting the entire system.

The object of the invention is therefore to provide a method for detecting a message interface fault in a communications device which makes it possible to detect the layer in which the failure occurs, and then correct this specific fault by means of targeted measures with as few side effects as possible.

This object is achieved by the features of the independent claims. Advantageous further developments of the invention are set out in the dependent claims.

The inventors have recognized that it is possible to check the status information of individual layers or all layers with a monitoring function, and consequently to detect a fault, locate it, and if necessary signal it. As a result, a repair can be initiated more effectively, more quickly and in a more targeted manner by a partial or total reboot of only the affected layer than would be the case with a full reboot. If an automatic repair is not possible, the targeted fault alerting provides the basis for a quick, efficient and manual repair.

Accordingly, the inventors propose to improve the method for detecting a message interface fault in a communications device, in which the message interface has at least two layers and the layers communicate with each other, and a higher layer accesses services on the layer below and offers its own services to higher layers, in such a way that, for detecting faults in the layers, at least one test application sends at least one test message which checks status information of at least individual layers, by means of which the communications capability between the layers of the message interface is checked.

This allows the availability of a communications system to be increased. The reason for this is that it is not necessary to restart or reboot the entire system in the event of a fault, but possibly only the faulty instance of the respective layer in the communications stack.

The novel method enables the physical connection between different interface instances to be checked by means of a test. If it is performed at short intervals, in the event of a connection failure the test offers the opportunity to obtain virtually real-time specific information about which layer of the communications protocol stack is still functioning and which is not. On the one hand such alerts can be issued immediately, or on the other hand they can be collected as indicators and combined by a control function to form a logical communications overview of the system, consequently enabling complex automatic fault analysis of the logical communications model or, respectively, ensuring maximum reliability in the detection of faults.

An alert can be issued for the overall picture as such, or it can serve as the basis for automatic repair measures. In both cases the system or its operator profits from detailed logical fault information that would otherwise not be available without the invention. In both cases this information enables the repair measure to be carried out faster and in a more targeted manner, and consequently there is usually no time lost, nor is any outlay required for additional diagnostics. The repair measure can be restricted to the degree necessary, for example by rebooting only one layer that is causing problems rather than rebooting the entire system platform.

All these effects result in an increase in the availability of the system by reducing or avoiding downtimes. In addition, a reduction in maintenance costs can be achieved by the automatic detection and targeted alerting of faults in the communications logical layer model which would otherwise lead to a communications failure.

A layer may be designed as a physical layer in the communications device. With the novel method it is then possible to check the variables of the physical layer, preferably information about an existing Ethernet driver, by means of the at least one test message sent of the at least one test application. As a result it is possible to check in a simple manner whether a connection is possible at all over the message interfaces.

A layer may be a data link layer in the communications device. In the novel method, the functioning of the data link layer and of the message interface can be checked if the test application checks the communications capability by sending the test message from the data link layer of the message interface to another layer of the message interface.

Analogously, a layer may be a network layer. To check the network layer, when it is sent a test message can be sent through a path of the communications device, but not through the network layer. For receiving the test message, a path which includes the network layer is used. This consequently checks whether the network layer and all layers below the network layer are functioning correctly. It would not be sufficient to send only one test message between 2 network addresses (e.g. IP addresses) of the same server, as in this case the test packet would only run through the loopback interface and it would be impossible to determine whether there is actually any external connection capability.

It is expedient if the test message is sent and picked up using a separate application process which is only tailored to this test message only. This prevents other applications currently active on the communications device being affected or impeded by the test message.

In one variant of the novel method, a loopback interface can be used to determine whether the network layer is functioning. If the IP loopback test and the layer 2 test were successful, it can likewise be concluded that external communication is possible.

Analogously, a test message can be sent over the loopback interface in order to check the functioning of a transport and application layer.

In a key advantageous variant of the method according to the invention, in the event of at least one fault being found in one or more layers, the test application initiates a repair by means of a partial or total reboot of all layers involved. As a consequence, it is not necessary to restart or reboot the entire system, but possibly only the faulty instance. The availability of the system is consequently optimized particularly well.

In addition, the test application can indicate the fault and/or the fault location within the communications device. If rebooting a layer that was indicated faulty is unsuccessful, any required manual repair of the faulty layer can be carried out quickly and in a targeted manner.

By virtue of this method it is possible to test the functioning of all transport protocol layers, including that of the SCTP (Stream Control Transmission Protocol). As a result, the novel method can be used widely on many communications devices because the Stream Control Transmission Protocol is generally used by said communications devices for transporting signaling data.

BRIEF DESCRIPTION OF THE DRAWINGS

The invention will be described in greater detail below with reference to the preferred exemplary embodiments with the aid of the figures; note that only the elements essential for the direct understanding of the invention are shown. The following reference numerals are used in the FIGS: 1: switch 1; 2: switch 2; 3: crosslink; 3.1: failure in crosslink; 4: PCU/server; 4.1: connection between PCU and switch 1; 4.2: connection between PCU and switch 2; 5.1: SCTP protocol instance in PCU 1; 5.2: SCTP protocol instance in PCU 1; 5.3: logical connection between SCTP protocol instances, physical connection is via crosslink; 5.4: failure of SCTP protocol instance in PCU 1; 6.1: IP protocol instance in PCU 1; 6.2: IP protocol instance in PCU 2; 6.3: logical connection between IP protocol instances, physical connection is via crosslink; 6.4: IP module in node 10; 6.5: IP module in node 11; 7.1: data link protocol instance for Ethernet interface 1; 7.2: data link protocol instance for Ethernet interface 2; 7.3: logical connection between data link protocol instances, physical connection is via crosslink; 8.1: Ethernet driver for interface 1; 8.2: Ethernet driver for interface 2; 8.3: Ethernet driver in node 10; 8.4: Ethernet driver in node 11; 9: physical layer/layer 2 switch; 9.1: connection physical layer interface 1; 9.2: connection physical layer interface 2; 9.3: physical layer in node 10; 9.4: physical layer in node 11; 10: first node; 11: second node; 12.1: UDP protocol instance in node 10; 12.2: UDP protocol instance in node 11; 13.1: failover control process in node 10; 13.2: failover control process in node 11.

In the drawings
FIG. 1: shows a basic diagram depicting a failure of a crosslink between two layer 2 switches;
FIG. 2: shows a basic diagram depicting part of a communications device with two interfaces, with a fault occurring in one protocol instance.

DETAILED DESCRIPTION OF INVENTION

Figure 3:
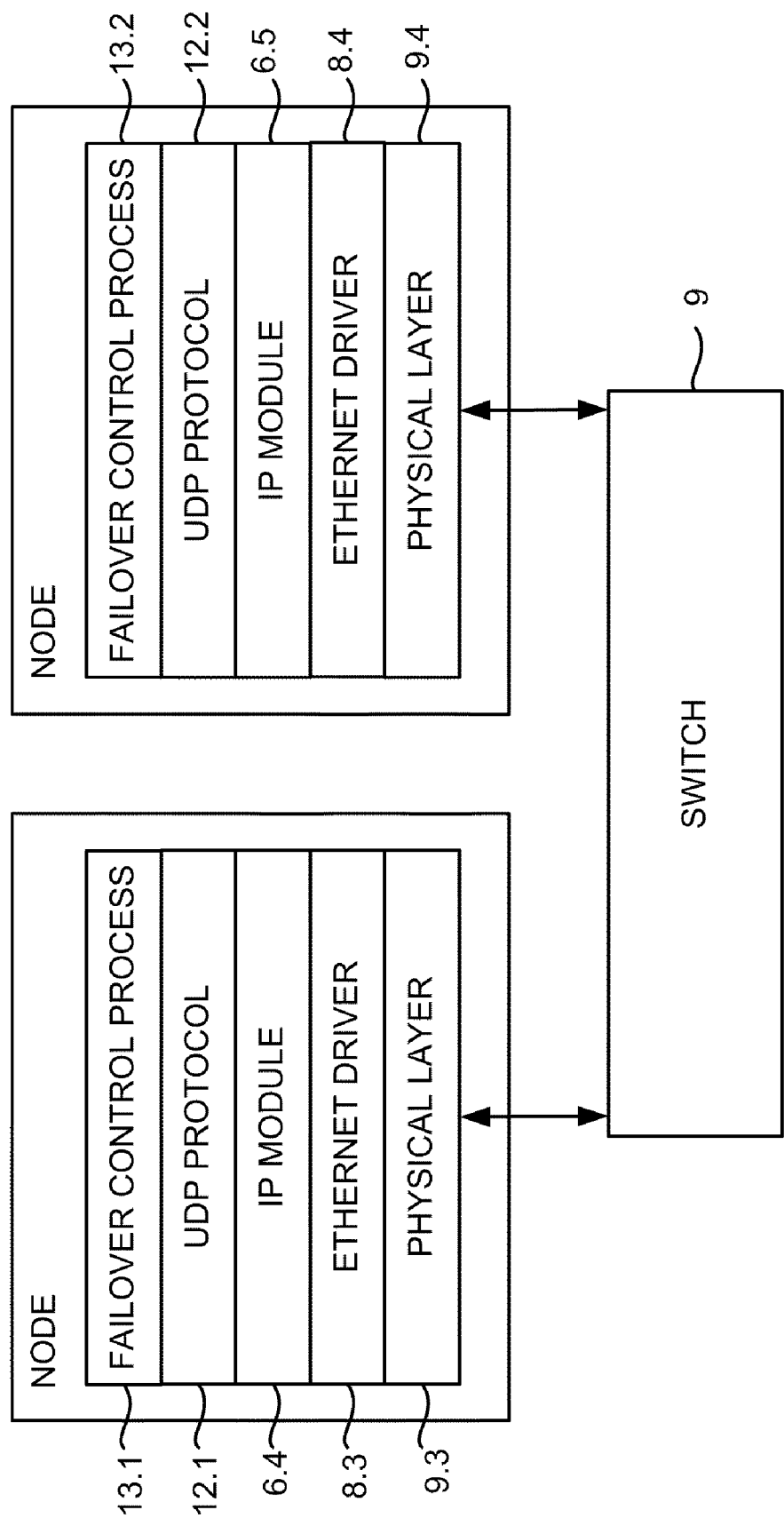
FIG. 3: shows a basic diagram of a connection between two nodes of a communications unit as well as associated communications stack with the relevant components within the nodes.

FIG. 1 shows a basic diagram depicting a failure 3.1 of a crosslink 3 between two interfaces of switches 1 and 2. In redundant network configurations, critical failure units must usually always be provided in duplicate. For this reason, Surpass servers, such as the HiQ10, HiQ20, HiQ30 or PCU 4 for example, are each connected by an Ethernet port to a layer 2 switch in each case. Said two switches 1 and 2 are connected by means of at least one crosslink 3. Certain network configurations can cope with either the failure of the crosslink 3.1 or the failure of an Ethernet port without loss. It is only the next crosslink failure 3.1 that then destroys the communications capability.

By virtue of the novel method, now both an individual port failure of a redundant interface card on one of the servers and a failure of the crosslink between the switches are detected and alerted. By detecting the failure 3.1 of the crosslink 3, it is possible to initiate a repair promptly. The failure 3.1 of a crosslink 3 is characterized by the fact that the connections or the links 4.1 and 4.2 from the server 4 to the switches 1 and 2 are active, which can be checked by interrogating the link status of the drivers of the server 4. However, communication from one interface instance 1 or 2 to the respective other interface instance 2 or 1 is not functioning. For instance, an application may be running on the PCU 4 which needs to send (data) packets back and forth between the two interfaces 1 and 2. Of necessity, said (data) packets must travel over the crosslink 3 connecting the two switches 1 and 2. If this communication between the two switches 1 and 2 now fails, in the novel method a monitoring application can deduce that the crosslink 3 has a failure 3.1 if the Ethernet drivers indicate that the electrical communication, or the link 4.1 and 4.2 respectively, between the switch 1 and 2 and the PCU 4 is OK.

FIG. 2 shows a basic diagram in which a fault 5.4 occurs in an SCTP protocol instance 5.2. A special transport protocol, namely usually SCTP (=Stream Control Transmission Protocol), is often used in telecommunications for transporting signaling data. This may be realized as a kernel driver or as a user-level protocol, but in general it is not part of the operating system. If, for example, only one SCTP protocol instance needs to be reinitialized (this is the SCTP protocol instance 5.2 in FIG. 2), it is possible to avoid a complete platform recovery or reboot. As a result it is possible to achieve higher availability of the overall system.

In FIG. 2 it is assumed by way of example that an IP-based communications device with two interface instances 1 and 2 is present (enclosed by dotted lines) which are connected to a layer 2 switch, designated the physical layer 9. The driver software of the drivers 8.1 and 8.2 can check whether an electrical connection 9.1 and 9.2 exists between the interface instances 1 and 2 and the physical layer/layer 2 switch 9. On the next higher layer, an application—in the case of the high-availability PCU cluster this is the monitoring process FO-CTRL—can check whether communication, or a link 7.3 respectively, is possible between the two Ethernet interfaces via the switch/physical layer 9, without including the IP protocol instances 6.1 and 6.2 in the test. In addition, another application can check whether a communications capability 6.3 exists between the protocol instances 6.1 and 6.2 for an IP packet. In this case the IP packet must be assembled and sent directly on layer 2. Otherwise an IP packet sent from the device to one of the local IP addresses of the same communications device would only travel over the loopback interface and would never leave the communications device. A further test application can use the same method to send an SCTP packet via a link 9.1 or 9.2 and check whether it is picked up at the SCTP module 5.1 or 5.2. These tests can be further supported by loopback tests on the IP or transport layer, that is to say between the IP protocol instances 6.1 and 6.2 or the SCTP protocol instances 5.1 and 5.2 respectively. If it not possible for example to pick up the SCTP packet again, but it is possible to pick up the IP packet, then the novel method detects that a fault has occurred in an SCTP protocol instance 5.1 or 5.2, in this case in the SCTP module 5.2. With the aid of the novel method, said SCTP module 5.2 can be specifically reinitialized without rebooting the entire system.

FIG. 3 shows a further basic diagram depicting the connection of two nodes 10 and 11 of a communications unit via a so-called communications stack. The relevant components are also shown in the nodes 10 and 11. If an isolation of a PCU occurs in the communications unit, for example in the form of an isolation of a failover control process (FO-CTRL) 13.1 and 13.2 from its partner at the associated node 10 or 11, owing to the layered architecture of the communications stack this may have various reasons. No isolation occurs as long as one communications path between the nodes 10 and 11 is functioning. If, now, the failover control process FO-CTRL 13.1 on node 10 detects a communications problem with its partner process on node 11, for example an incorrect verification message, then it must know the exact reason for this in order to take suitable measures. This requires a detailed analysis of the communications stack. If a lower component in the communications stack stops working on its own node 10, for example the physical layer 9.3, then the failover control process FO-CTRL 13.1 on this node 10 must no longer access resources that it shares with node 11. This is necessary in order to avoid a situation in which both nodes think they now need to become active and use resources ("split-brain" syndrome). If, on the other hand, all lower components of the communications stack are active for the failover control process FO-CTRL 13.2 on node 11 and it is only no longer able to communicate with its partner process on node 10, then it would have to take over the resources that it shares with node 10. This simple example already illustrates that determining the origin of the communications failure is an important point in order to avoid a split-brain situation. This method may be implemented in the Surpass high-availability PCU for example.

The features of the invention cited above may of course be used not only in the combination stated in each case, but also in different combinations or individually without departing from the scope of the invention.

The invention claimed is:

1. A method for detecting a message interface fault in a communications device, comprising:
   providing a plurality of layers in the message interface, wherein the layers communicate with each other using a communication hierarchy, and a higher layer accesses services on the layer below and offers its own services to higher layers; and
   sending a test message from a test application, and checking status information for detecting faults in the plurality of layers via the test message such that a communications capability between the layers of the message interface is checked;
   wherein when a fault is found in at least one of the layers, the test application initiates a repair of each faulty layer via at least a partial reboot of the faulty layer;
   wherein one of the layers is a physical layer;
   wherein the test message checks variables of the physical layer; and
   wherein the test message checks variables about an Ethernet driver.

2. The method as claimed in claim 1,
   wherein one of the layers is a data link layer, and
   wherein the test application checks the communications capability by sending the test message from the data link layer of the message interface to another layer of the message interface.

3. The method as claimed in claim 1,
   wherein one of the layers is a network layer, and
   wherein the test message is sent through a path of the communications device which excludes the network layer and is received over the network layer.

4. The method as claimed in claim 1,
   wherein one of the layers is a transport or application layer, and
   wherein the test message is sent over the loopback interface to determine the functioning of the transport or application layer.

5. The method as claimed in claim 1, wherein the test application indicates the fault within the communications device.

6. The method as claimed in claim 1, wherein the test application indicates the fault location within the communications device.

7. The method as claimed in claim 1, wherein the test application checks the functioning of the layer of a Stream Control Transmission Protocol.

8. The method as claimed in claim 1,
   wherein one of the layers is a data link layer, and
   wherein the test application checks the communications capability by sending the test message from the data link layer of the message interface to another layer of the message interface.

9. The method as claimed in claim 1,
   wherein one of the layers is a network layer, and
   wherein the test message is sent through a path of the communications device which excludes the network layer and is received over the network layer.

10. The method as claimed in claim 9, wherein the test message is picked up by a separate application process tailored to the test messages only.

11. The method as claimed in claim 9, wherein a loopback interface is used to determine the functioning of the network layer.

12. The method as claimed in claim 11,
    wherein one of the layers is a transport or application layer, and
    wherein the test message is sent over the loopback interface to determine the functioning of the transport or application layer.

13. The method as claimed in claim 12, wherein the test application indicates the fault within the communications device.

14. The method as claimed in claim 12, wherein the test application indicates the fault location within the communications device.

15. The method as claimed in claim 12, wherein the test application checks the functioning of the layer of a Stream Control Transmission Protocol.

* * * * *